United States Patent
Tsuzuki et al.

(10) Patent No.: US 6,877,390 B2
(45) Date of Patent: Apr. 12, 2005

(54) SHIFT RANGE CHANGEOVER MECHANISM

(75) Inventors: Shigeo Tsuzuki, Anjo (JP); Jiro Maeda, Anjo (JP); Naoki Ohkoshi, Anjo (JP)

(73) Assignee: Aisin AW Co., Ltd. (JP)

( * ) Notice: Subject to any disclaimer, the term of this patent is extended or adjusted under 35 U.S.C. 154(b) by 0 days.

(21) Appl. No.: 10/372,634

(22) Filed: Feb. 25, 2003

(65) Prior Publication Data

US 2004/0018907 A1 Jan. 29, 2004

(30) Foreign Application Priority Data

Feb. 28, 2002 (JP) ........................................ 2002-054716
Feb. 28, 2002 (JP) ........................................ 2002-054717

(51) Int. Cl.[7] ........................ F16H 59/00; B60K 17/04
(52) U.S. Cl. ...................................... 74/335; 74/473.12
(58) Field of Search ........................... 74/473.25, 335, 74/473.12, 473.28; 464/182; 475/131

(56) References Cited

U.S. PATENT DOCUMENTS

| | | | | |
|---|---|---|---|---|
| 3,527,116 A | * | 9/1970 | Kimberlin | ................ 74/473.12 |
| 5,094,115 A | * | 3/1992 | Michihira et al. | ............ 74/335 |
| 5,607,023 A | * | 3/1997 | Palm | ........................... 464/182 |
| 6,230,576 B1 | * | 5/2001 | Yamada et al. | ........... 74/473.12 |
| 6,348,002 B1 | * | 2/2002 | Breese | ........................ 464/182 |
| 6,401,899 B1 | * | 6/2002 | Kanehisa et al. | ......... 192/219.5 |
| 6,477,910 B1 | * | 11/2002 | Ebashi et al. | ................... 74/335 |
| 6,546,348 B1 | * | 4/2003 | Kusafuka et al. | .............. 702/96 |
| 6,550,351 B1 | * | 4/2003 | O'Reilly et al. | .......... 74/473.12 |
| 6,617,722 B1 | * | 9/2003 | Ooyama et al. | ........... 310/68 B |
| 2001/0039227 A1 | * | 11/2001 | Kusafuka et al. | ............ 475/149 |
| 2002/0056335 A1 | * | 5/2002 | Satou et al. | .............. 74/473.12 |

FOREIGN PATENT DOCUMENTS

JP    7-16067    3/1995

* cited by examiner

*Primary Examiner*—Roger Pang
(74) *Attorney, Agent, or Firm*—Lorusso, Loud & Kelly

(57) ABSTRACT

A vehicle range changeover mechanism is driven in response to operation of a shift lever. The range changeover mechanism has an output sector gear that is unrotatably connected to a range control shaft, and a position detecting sensor, a portion of which that is interlocked with and connected to the range control shaft. Looseness between the output sector gear and the position detecting sensor portion is eliminated by provision of a leaf or spring plate, thereby assuring rotation of the position detecting sensor portion corresponding one to one with the rotational motion of the range control shaft.

10 Claims, 7 Drawing Sheets

SHIFT RANGE CHANGEOVER MECHANISM

INCORPORATION BY REFERENCE

The disclosure of Japanese Patent Application No. 2002-054717 filed on Feb. 28, 2002, including the specification, drawings and abstract, are incorporated herein by reference in its entirety.

BACKGROUND OF THE INVENTION

1. Field of the Invention

The present invention relates to a shift range changeover mechanism mounted in a vehicle or the like, more specifically, it relates to a range changeover mechanism with a drive such as an electric motor which operates in response to the operation of shift range selector such as a shift lever, and controls, for example, a hydraulic control device to change a shift range.

2. Related Art

Conventionally, a range changeover mechanism includes a manual valve that changes the shift range within a transmission and a shift lever provided in the interior of a vehicle and connected to the manual valve via a shift cable. Thus, in such a mechanism, the shift lever operates the manual valve via the shift cable with operation by a driver.

However, increased flexibility in location of the shift lever is needed to respond to demands for increasing the degree of freedom in vehicle interior design and for expanding derivative vehicle types from identical platforms. However, the above-mentioned shift cable, which connects the shift lever and the manual valve, has many layout restrictions and the development of a range changeover mechanism that does not use such a shift cable is desired.

Japanese Patent Laid-Open Publication ("Kokai") No. 7-16067 discloses a range changeover mechanism that changes the shift range using an electric motor (and magnetic clutch) in a so-called shift-by-wire system. In the range changeover mechanism disclosed in this publication, the driving force of an electric motor, responsive to the operation of a shift lever, is transferred to a range control shaft via a predetermined reducer to rotate the control shaft, and the shift range is changed through, for example, operation of a hydraulic control unit of an automatic transmission and a parking mechanism via the detent lever fixed to the control shaft. The above-mentioned demand for greater flexibility regarding the location of installation of the shift lever is answered by such a structure.

In the range changeover apparatus disclosed in Kokai No. 7-16067, by engaging the range control shaft with a sector gear interlocked with and connected to the transmission side downstream of the reducer, the rotation of the sector gear is transferred to the range control shaft. By detecting the rotational position of the detent lever, i.e. the rotational position of the range control shaft, with a position detecting sensor, the current state of range changeover is continuously detected, thereby changing and controlling the shift range.

Known position detecting sensors include, for example, sensors such as an electromagnetic pickup system, a magnetic system using a magnetoresistance element (MRE) and a Hall element, and an optical system using a slit disc and a photo interrupter. All are equipped with a rotor interlocked with and connected to the sector gear or the like, and a sensor body fixed to the casing side of the range changeover mechanism. When using such a position detecting sensor, the rotor and sector gear are splined together to form an integrally rotating structure.

However, in the above-described range changeover mechanism, detection of the precise rotational position of the range control shaft, i.e. the precise rotational position of the detent lever, with a high level of accuracy, becomes difficult due to spline looseness ("play") between the sector gear and the rotor. Therefore, realization of a range changeover mechanism having a structure that enables execution of shift range control with greater accuracy by precisely detecting the rotational position of the range control shaft is needed.

SUMMARY OF THE INVENTION

Accordingly, it is an object of the present invention to eliminate spline connection looseness (play) between the range control shaft and the position detecting sensor (detecting mechanism), and to solve the problems described above by providing a shift range change mechanism which enables detection of the precise rotational position of the range control shaft and, accordingly, the precise rotational position of the detent lever.

A vehicle range changeover mechanism according to a first aspect of the present invention includes a shift range selector; a drive mechanism that operates in response to the operation of the shift range selector; a shift range operator, e.g., manual valve, that shifts the shift range between, for example, P, R, N, D, Ds ranges, utilizing the driving force from the drive mechanism; a range control shaft that transfers the driving force from the drive mechanism to the shift range operator; and a detecting mechanism that detects the rotational position of the range control shaft; wherein the torque of the drive mechanism is transferred to a gear member which is connected to the range control shaft in a manner preventing relative rotation therebetween, and wherein a portion of the detecting mechanism is directly connected to the range control shaft.

Therefore, it is possible to eliminate looseness in the splined connection between the detecting mechanism and the gear member by directly connecting the detecting mechanism to the gear member as well as to the range control shaft, and to rotate the detecting mechanism in a state corresponding one to one with the rotational motion of the range control shaft. Thus, the rotational position of the range control shaft is detected with higher accuracy, enabling high precision control of shift range change.

The vehicular shift range changeover mechanism according to the first aspect of the present invention may further include a spring member, disposed between the engaging surfaces of the connecting portions of the detecting mechanism and the range control shaft, to provide a tighter connection between the engaging surfaces. Therefore, it is possible to eliminate looseness ("play") between the detecting mechanism and the gear member, and to obtain a higher precision connecting structure by disposing the spring member between the engaging surfaces of the connecting portions of the detecting mechanism and the range control shaft.

In the vehicle shift range changeover mechanism according to the first aspect of the present invention, the gear member has a supporting hole extending along a rotational axis defined by the range control shaft; the detecting mechanism has a rotatable portion which has a protrusion inserted into the supporting hole; and a first seal member is provided between the supporting hole and the protrusion to create a fluid-tight seal between the range control shaft side and the detecting mechanism side of the supporting hole. Therefore, it is possible to completely prevent problems such as grease disposed between the range control shaft outer peripheral surface and the supporting hole inner peripheral surface, as well as dirt from the range control shaft side, from penetrating the detecting mechanism, thereby protecting the detecting mechanism.

In the vehicle shift range changeover mechanism according to the first aspect of the present invention, the gear member may have a boss extending in the direction of the axis of rotation, and a second seal member provided between the boss and a case member of the drive mechanism to create a fluid-tight state in the interior of the drive mechanism to prevent problems such as grease and dirt from outside the case member from penetrating into the drive mechanism.

The vehicle shift range changeover mechanism according to the first aspect of the present invention may have a rotatable portion of the detecting mechanism connected to one end of the range control shaft; and an engaging notch is provided either within the rotatable portion of the detecting mechanism or in one end of the range control shaft, and an extension that seats within the notch provided on the other. It is possible to easily and reliably engage the extension within the notch by simply pressing them together.

The spring member preferably has a plate portion with a substantially U-shaped cross-section which is disposed between the engaging portion (or "extension") and the engaging notch, and flange portions extending outward from both ends of the plate portion.

DESCRIPTION OF THE PREFERRED EMBODIMENTS

Hereinafter, preferred embodiments of the present invention will be described in detail with reference to the accompanying drawings.

Figure 1:
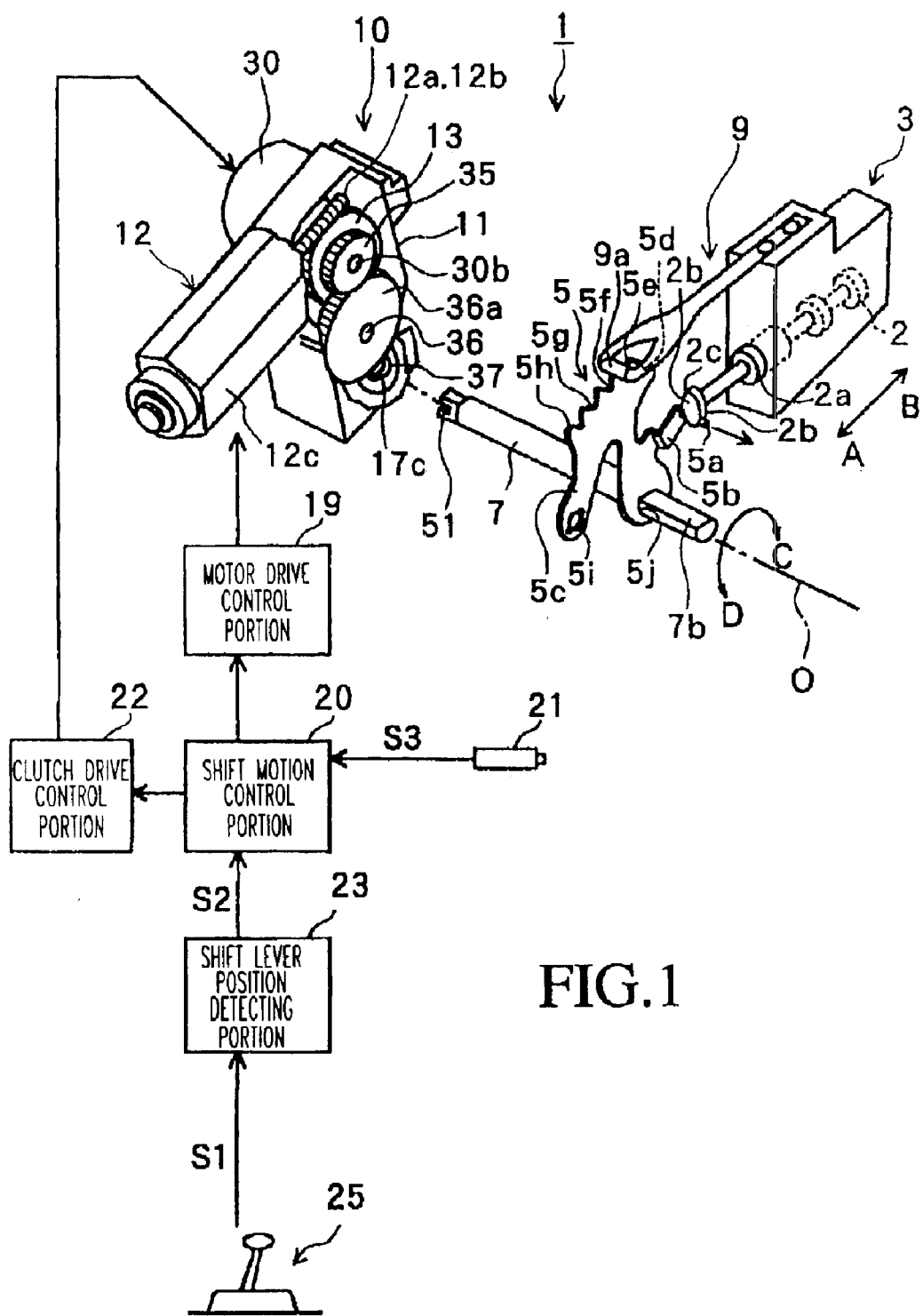
FIG. 1 is a drawing illustrating an example of a vehicle range shifting mechanism in accordance with the present invention.

FIG. 1 shows one preferred embodiment of a vehicle range changeover (range shifting) mechanism 1 of the present invention as including a manual valve 2, which is a changeover valve that is a portion of an automatic transmission such as a multi-stage automatic transmission (not shown) or a continuously variable transmission (not shown). The manual valve 2, which serves as a "shift range operator," is stored in a valve body 3 formed as a portion of a cover of the automatic transmission. The manual valve 2, as mounted within the valve body 3 is movable in the directions of Arrows A and B, i.e., directions of movement of spool 2a of the valve 2. The automatic transmission, by moving the manual valve 2 in the directions of Arrows A and B between predetermined positions, sequentially shifts from Arrow A towards Arrow B in the figure, for example, in the order of ranges P, R, N, D, Ds.

One end of the manual valve 2 has an engaging groove 2c comprising two discs 2a and 2b, and a detent lever 5 engages the engaging groove 2c via a pin 5a in an arm portion 5b of the detent lever 5. The detent lever 5 has a plate-shaped body 5c with, for example, five range concave notches 5d, 5e, 5f, 5g, and 5h formed at predetermined locations in an upper portion of the edge of the body 5c in the figure. The range concave notches 5d, 5e, 5f, 5g, and 5h correspond to, for example, the P, R, N, D, and Ds ranges of the automatic transmission, aligned in order from the right hand side of the figure. In addition, the arm portion 5b carries the pin 5a as a protrusion on one side of the body 5c in FIG. 1. On the opposing side of the body 5c in the drawing figure, a parking mechanism drive parking rod engaging hole 5i is provided for establishing P range (not shown). Also, a rectangular hole 5j is penetrated by range control shaft 7 inserted therein.

A plate spring 9 is fixed at one end to a hydraulic control device 3, to the case of the automatic transmission, or the like, and has a distal end that applies a downward force by its own elasticity and that carries a roller 9a supported in a manner allowing free rotation, for engagement of the roller 9a within one of the five range concave notches 5d, 5e, 5f, 5g, and 5h. Further, the range control shaft 7 engages the detent lever 5 in the engaging hole 5j.

One end of the range control shaft 7 is provided with an engagement notch 51 (see FIG. 2) and is fitted within a supporting hole 31 of an output sector gear 17 provided in a valve drive device 10. The valve drive device 10 has a box-shaped casing 11 and is attached to the cover (not shown) or the like of the automatic transmission by bolts or other means. An electric motor 12, having a rotating shaft 12a in the form of a worm gear, is fixed to the casing 11. A worm wheel 13 that is fixed to an input shaft of a magnetic clutch 30, attached to the casing 11, engages the worm gear 12a.

A small gear 35 is provided on an output shaft 30b of the worm wheel, and the small gear 35 is in meshing engagement with a large gear 36a on an intermediate shaft 36 rotatably supported in the casing 11. A small gear (not shown) is formed on the intermediate shaft 36, and the small gear meshes with teeth 17b (see FIGS. 2 and 3) of the output sector gear 17.

A drive motor controller 19 is connected to the electric motor 12, and a shift motion controller 20 is connected to the drive motor controller 19. A position detecting sensor 21 that detects the position of the range control shaft 7, and accordingly the position of the detent lever 5, a clutch drive controller 22, and a shift lever position detector 23, all housed within the casing 11, are connected to the shift motion controller 20. A shift lever 25 (or a shift switch or the like), which is a shift range selecting means, is connected to the shift lever position detector 23. The position detecting sensor 21 may be provided anywhere, so long as it is able to detect the current position of the detent lever 5; however, it is most suitably provided within the casing 11 in a manner to make the device compact.

The aforementioned manual valve 2, the hydraulic control device 3, the detent lever 5, and the detent spring 9 together form a shift range operating mechanism that enables a shift range changeover operation. Also, a drive mechanism that operates in response to the operation of the shift lever 25 (the shift range selector) is formed by the combination of the electric motor 12 and the output sector gear 17.

The valve drive device 10 and the structure connecting it to the range control shaft 7 will now be described in detail with reference to FIGS. 2 to 5.

Figure 2:
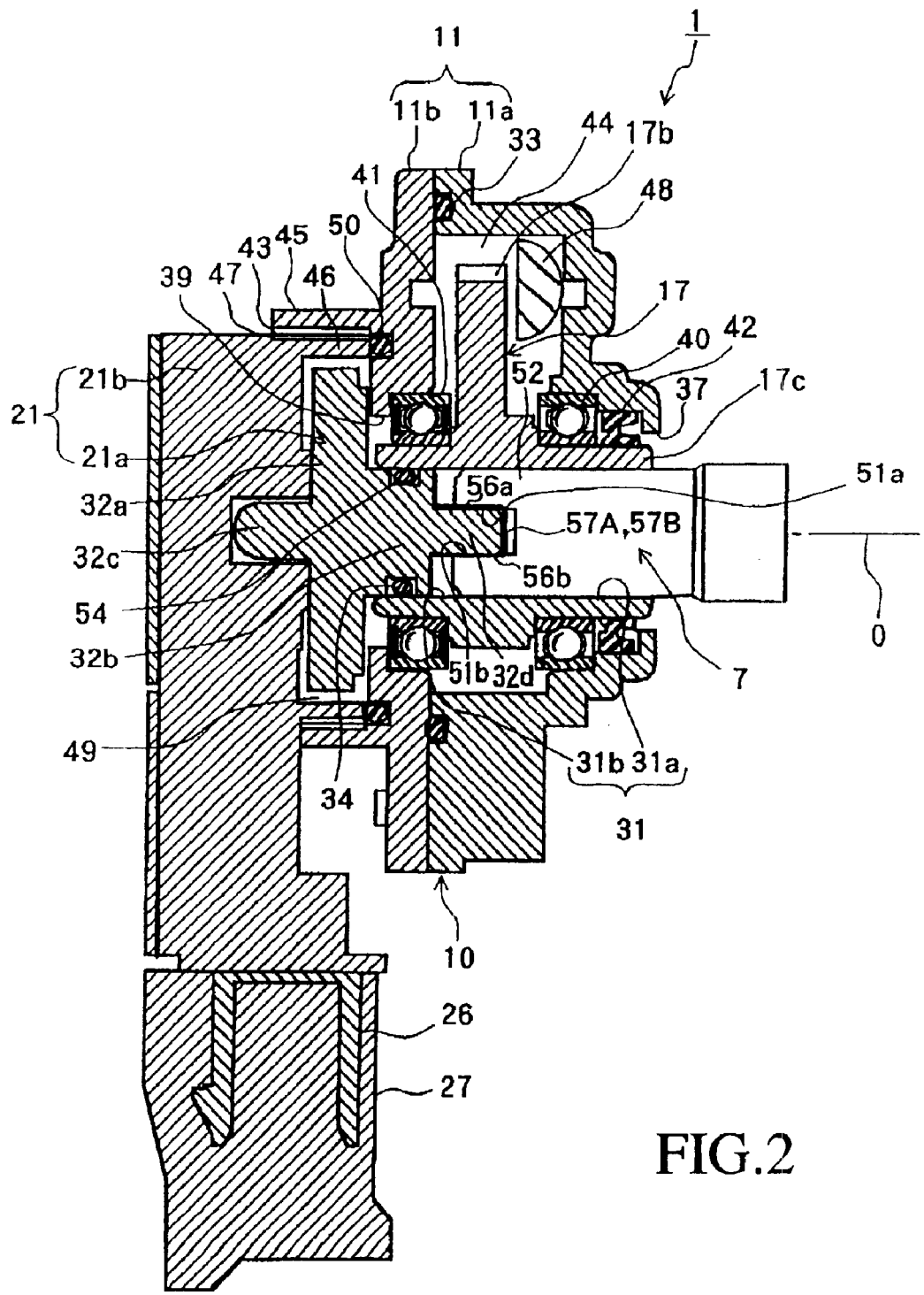
FIG. 2 is a longitudinal sectional view of a valve drive device.

As shown in FIG. 2, the valve drive device 10 has a casing 11 formed by a pair of case members 11a and 11b. An oil-tight state of the mutually contacting surfaces of these case members 11a and 11b is provided by an O-ring 33. A circular aperture 37 for accommodating the range control shaft 7 inserted therein is formed in a wall portion of the case member 11a facing in the right-hand direction in the figure. A circular aperture 39 for receiving the protruding portion 32b of the rotor 21a is formed in the wall portion of the case member 11b facing in the left-hand direction in the figure. The output sector gear 17 is rotatably supported within the casing 11, at both ends of a boss portion 17c. More specifically, the output sector gear 17 is supported within the circular apertures 37 and 39, via ball bearings 40 and 41, respectively, so as to enable rotation by the driving force from the electric motor.

An oil seal 42 is fitted between the outer peripheral surface of the boss portion 17c front end portion and the inner peripheral surface of the circular aperture 37 of the case member 11a to maintain an oil-tight seal therebetween. Thus, the oil seal 42 provided between the boss portion 17c, extending in the direction of a rotation axis O, and the case member 11a creates a fluid-tight seal between the interior and exterior of the drive mechanism, thus completely preventing problems such as grease and dirt from outside the case member 11a penetrating into the drive mechanism.

Further, the ball bearing 41 is a seal bearing which itself constitutes a seal structure and, accordingly, maintains an oil-tight seal between the interior and exterior sides of the circular aperture 39, thereby providing an interior space 44 that is wholly maintained in an oil-tight state. An end of the range control shaft 7 is fitted in the boss portion 17c of the output sector gear 17. In short, the output sector gear 17 is connected in a manner preventing rotation relative to the range control shaft 7. Further, the protruding portion 32b of the rotor 21a is rotatably supported by insertion into the boss portion 17c. Reference numeral 48 in the figure denotes an operation lever for manually selecting the shift range by movement to a position such as parking when the electric motor 12 malfunctions or the like.

Also, the case member 11b has a cylindrical supporting portion 45 with splines 43 on its inner surface which supports a sensor body 21b. The position detecting sensor 21 includes the rotor 21a and the sensor body 21b supported by the cylindrical supporting portion 45. The sensor body 21b carries a plug 26, and by connecting the plug 26 to a connector 27, is connected to the shift motion controller 20 shown in FIG. 1. The position detecting sensor 21 can be, for example, an electromagnetic pickup system, a magnetic system using a magnetoresistance element and a Hall element, an optical system using a slit disc and a photo interrupter, or the like.

Splines 47 formed on the outer peripheral surface of an engaging cylindrical portion 46 protruding from the sensor body 21b are engaged with the splines 43. Also, an oil-tight state is maintained between the cylindrical supporting portion 45 and the engaging cylindrical portion 46 by an O-ring 50 disposed between an end portion of the engaging cylindrical portion 46 and the back face of the case member 11b. Thus, a structure is obtained that rotatably accommodates the rotor 21a within an interior space 49 defined by the back face of the case member 11b, the sensor body 21b and the engaging cylindrical portion 46.

The rotor 21a includes a major diameter rotor body 32a, a minor diameter protrusion 32b extending from the rotor body 32a towards the supporting hole 31, and a shaft portion 32c extending from the side opposite the protruding portion 32b. Further, an engaging portion ("extension") 32d is formed on the protrusion 32b for engagement with the range control shaft 7.

Figure 3:
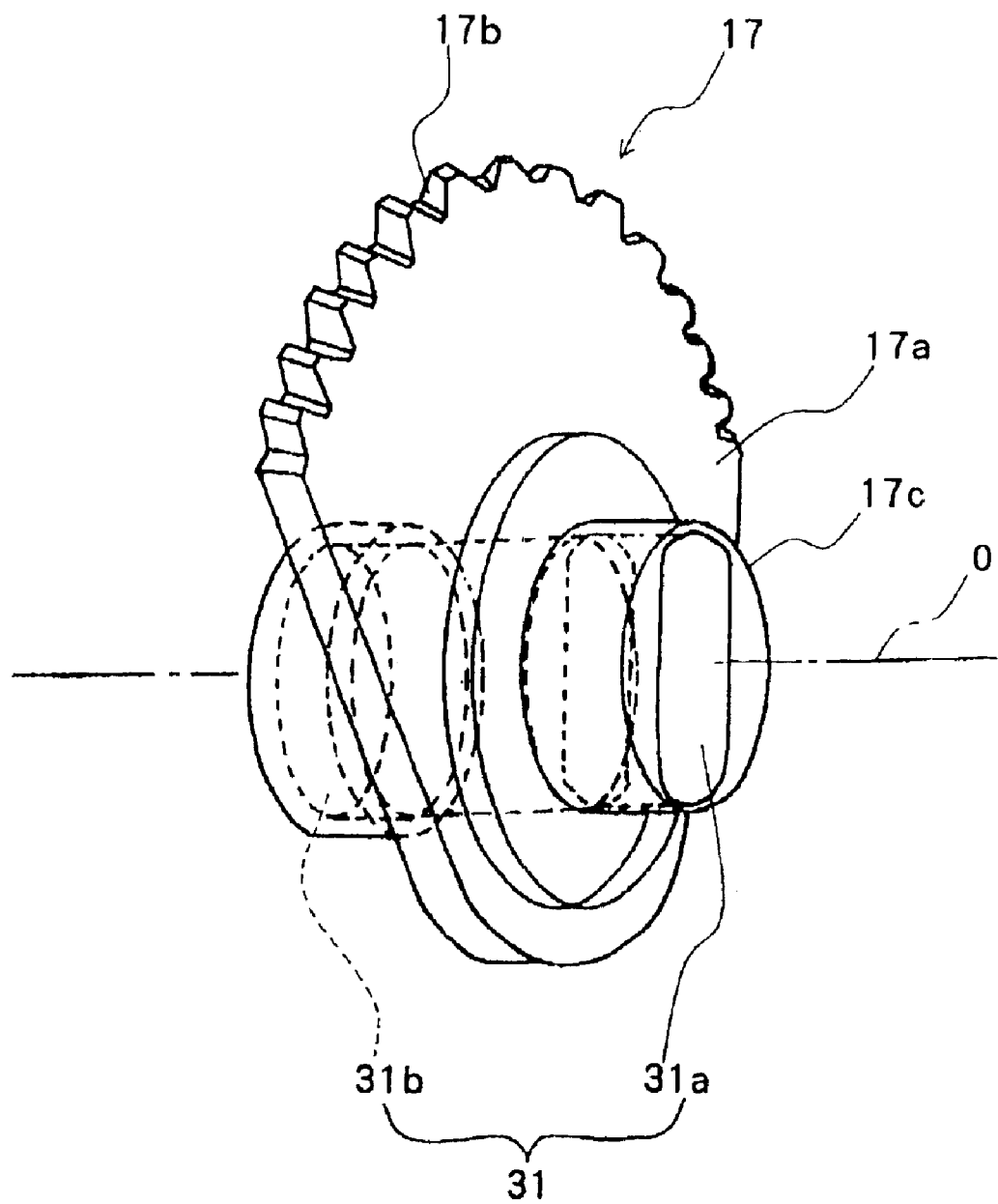
FIG. 3 is a perspective view illustrating in detail an output sector gear.

As shown in FIG. 3, the output sector gear 17 includes a gear body 17a which is substantially fan-shaped, teeth 17b formed on the outermost edge of the gear body 17a, and the boss portion 17c formed protruding in the fore-and-aft directions (right and left directions in FIG. 3) along the rotational axis (O) of the gear body 17a. Thus, the boss portion 17c has a supporting hole 31 bored along the rotational axis O, which hole 31 includes a first hole portion 31a that unrotatably receives an end portion of the range control shaft 7 of a predetermined shape to be described later, and a second engaging hole 31b that rotatably receives a column-shaped protrusion 32b of the rotor 21a. When viewed in the direction of the rotational axis O the first engaging hole 31a is seen as a substantially oval shape in which the right and left sides are in a straight line. The second engaging hole 31b has a tubular shape with an inner diameter slightly larger than the outer diameter of the protrusion portion 32b.

Figure 4:
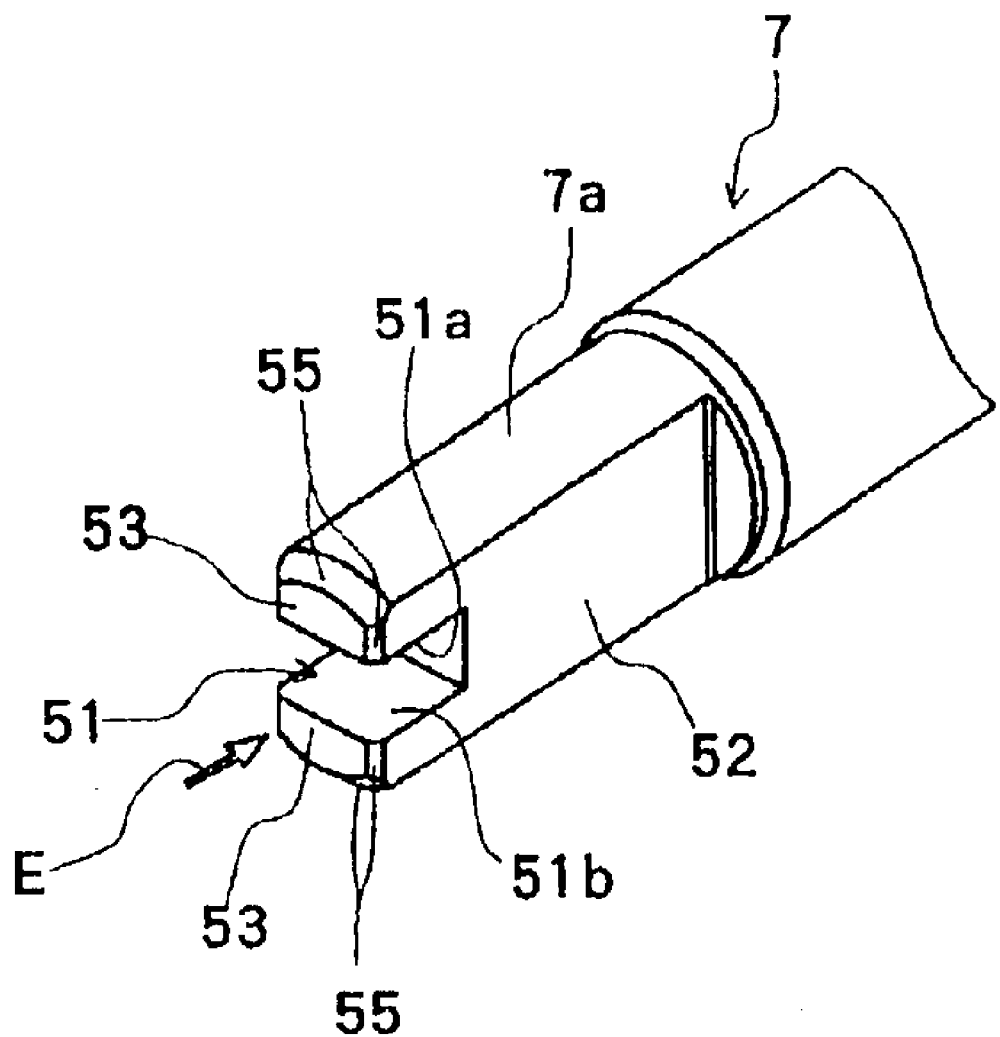
FIG. 4 is a perspective view illustrating in detail an end portion of a range control shaft.

As shown in FIG. 4, an end portion 7a of the range control shaft 7 has opposing flat surfaces 52 with a distal end surface chamfered so as to function as a key when inserted into the first engaging hole 31a, and has a substantially oval shape identical to that of the second engaging hole 31b when viewed from the direction of Arrow E in the figure. An engaging notch 51 that opens at the distal end surface is formed in the end portion 7a, and two opposing sidewalls of notch 51 respectively form engaging surfaces 51a and 51b, which are chamfered and extend parallel to the rotational axis O. Chamfered surfaces 55 simplify insertion of the end portion 7a into the first engaging hole 31a and are formed contiguous with the front end surface 53 of the engaging concave portion 51 on the end portion 7a.

Figure 5:
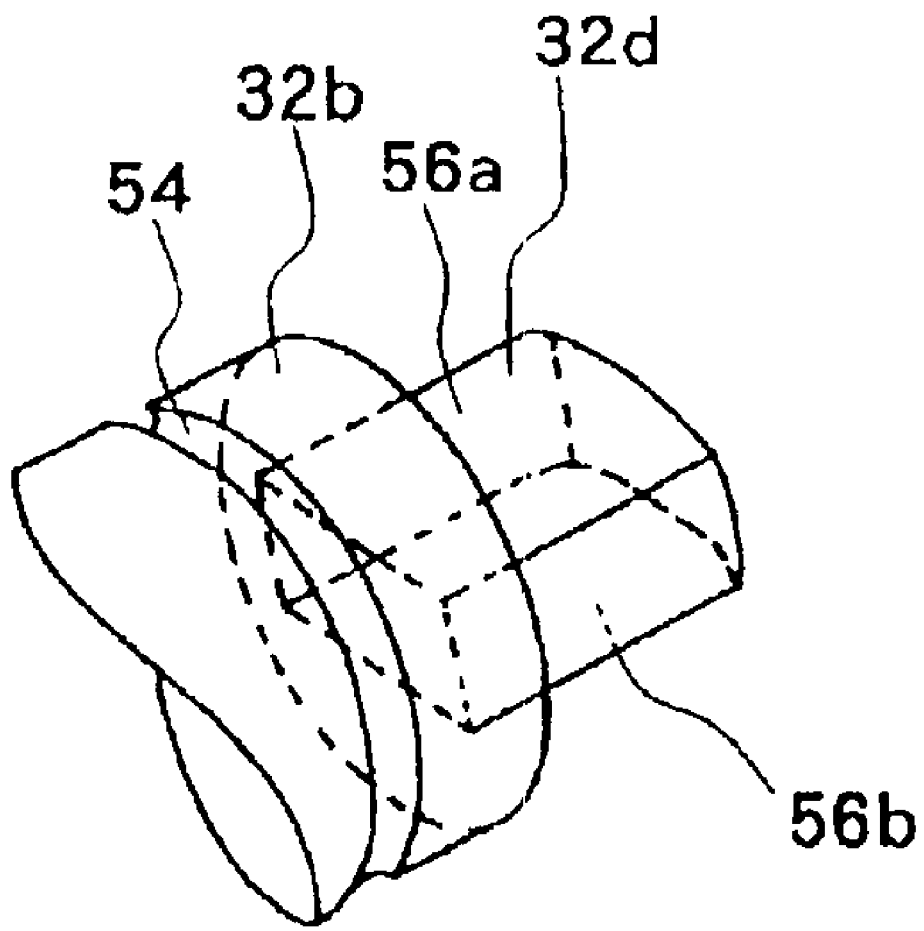
FIG. 5 is a perspective view illustrating in detail an end portion of a rotor of a position detecting sensor.

The protrusion 32b, as shown in FIG. 5, includes a fitting groove 54 formed along its outer cylindrical surface, and the engaging convex portion 32d which protrudes towards the range control shaft 7 for engagement with the engaging notch 51. The O-ring 34 (see FIG. 2), which contacts the inner peripheral surface of the second hole portion 31b of the supporting hole 31 and provides an oil-tight seal (fluid-tight state) between the position detecting sensor 21 side and the range control shaft 7 side of the supporting hole 31, is fitted into the fitting groove 54. Further, the engaging portion 32d has opposing surfaces 56a and 56b which are chamfered and extend in the direction of the rotational axis O of the output sector gear 17.

Figure 6:
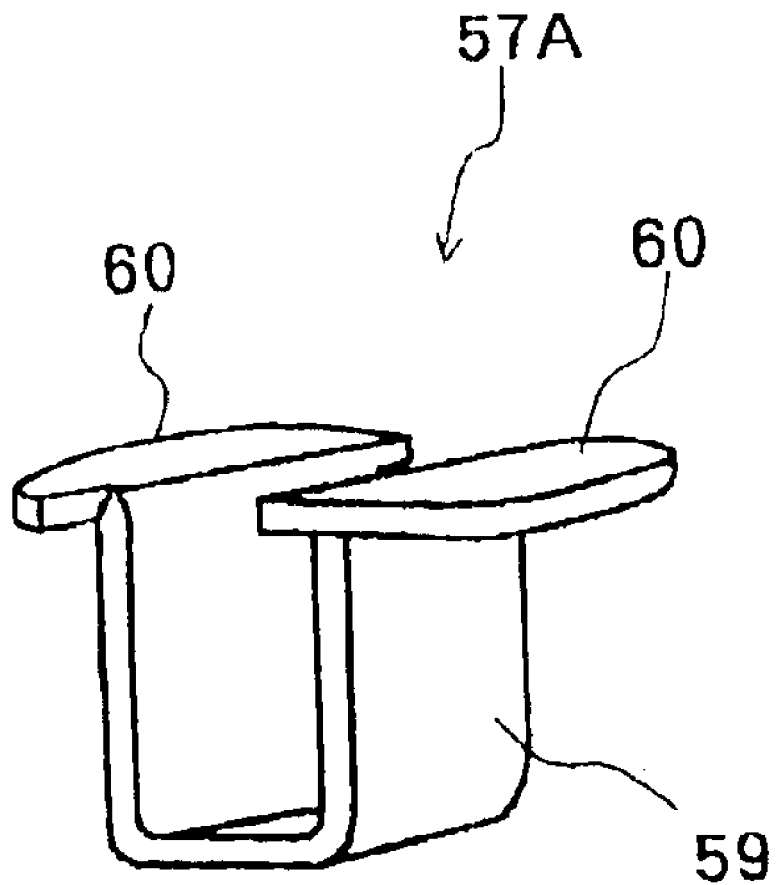
FIG. 6 is a perspective view of one example of a spring member.

As shown in FIG. 2, a spring member 57A is disposed between the engaging surfaces 51a and 56a, and the engaging surfaces 51b and 56b. The spring member 57A, as shown in FIG. 6, has a plate portion 59 with a substantially U-shaped cross-section disposed between the engaging notch 51 and the engaging portion 32d, and flange portions 60 and 60 formed so as to extend outward from respective ends of the plate portion 59. Each end of the flange portions 60 and 60 match the inner surface shape of the second engaging hole 31b of the boss portion 17c, and are cut so as together form a substantially circular shape.

Figure 7:
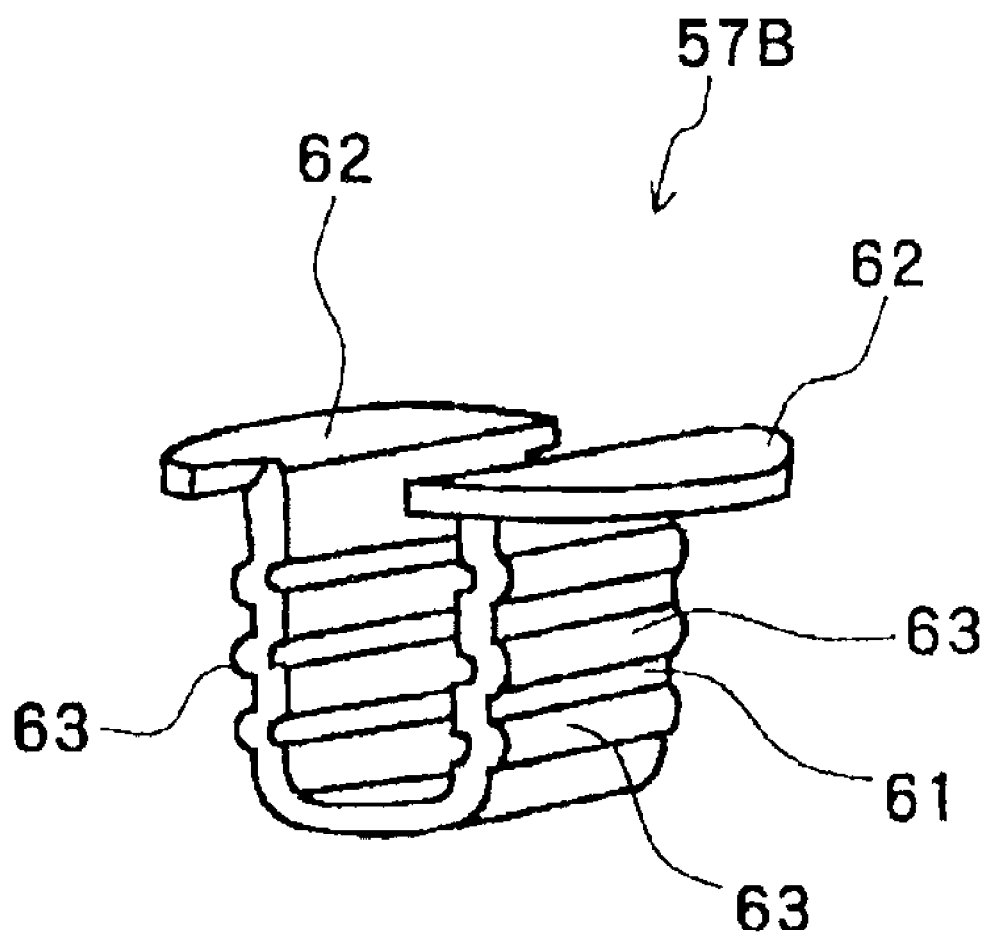
FIG. 7 is a perspective view of another example of a spring member.

Another embodiment of the spring member 57B, as shown in FIG. 7, has a plate portion 61 with a substantially U-shaped cross-section for disposition between the engaging notch 51 and the engaging portion 32d, and flange portions 62 and 62 formed so as to extend outward from respective ends of the plate portion 61. The flange portions 62 and 62 match the inner surface shape of the second engaging hole 31b of the boss portion 17c, and are cut so as to together form a substantially circular shape. Further, the spring member 57B is corrugated with a plurality of projections 63 formed parallel to each other on the plate portion 61.

In operation of the range shifting mechanism 1 of the embodiment described above, while the vehicle is being driven, the shift motion controller 20 determines whether the position of the shift lever 25 has been changed by the driver via the shift lever position detector 23. A shift signal S1 corresponding to the shift position is output as an electric signal from the shift lever 25 to the shift lever position detector 23. The shift lever position detector 23 calculates the current shift position selected by the shift lever 25 from the signal S1, and outputs a shift position signal S2 to the shift motion controller 20. Accordingly, the shift motion controller 20 is thus able to easily determine whether there are changes in the shift lever position by monitoring the shift position signal S2.

If the shift motion controller 20 determines there was a change in the shift lever position, it compares the result of the position change of the shift lever 25 (called a "target shift position") to the shift position that had been selected by the shift lever 25 up to that point (called a "current shift position"), and determines whether the electric motor 12 should be rotated forward in order to move the shift position from the current shift position to the target shift position.

The range position of the manual valve 2, as shown in FIG. 1, moves linearly in the direction of Arrows A and B and, therefore, it is necessary to determine whether to move the electric motor 12 forward or in reverse, in accordance with the current shift position relative to the target shift position. Hence, when changing the range in the direction P→R→N→D, for example, such as when changing to the D range from R via N, it is determined that the electric motor 12 be rotated forward and, conversely, when changing the range in the direction D→N→R→P, for example, such as when changing to the P range from D via N, it is determined that the electric motor be rotated in reverse.

Thus, at the point when the rotational direction of the electric motor 12 is determined by the shift motion controller 20, the shift motion controller 20 commands the motor drive controller 19 to have the electric motor 12 rotate in the determined rotational direction, in addition to commanding the clutch drive controller 22 to engage the magnetic clutch 30. Receiving this command, the motor drive controller 19 rotationally drives the electric motor 12 in the direction determined earlier, along with the clutch drive controller 22 exciting the coil (not shown) of the magnetic clutch 30 and connecting a suction disc and a suction rotor. Thus, the rotation of the electric motor 12 is transferred to the output sector gear 17 via the worm gear 12b, the worm wheel 13, the input shaft of the magnetic clutch 30, the suction rotor, the suction disc, the output shaft 30b, the small gear 35, the large gear 36a and a small gear of the intermediate shaft 36, thereby rotating the range control shaft 7 through a predetermined rotational angle in the direction of Arrow C or D of FIG. 1.

Consequently, the detent lever 5, in conjunction with the arm portion 5b, rotates through a predetermined angle in the direction of Arrow C or Arrow D, therefore the position of the pin 5a changes in accordance with degree of angular rotation. Thus, the spool of the manual valve 2 engaged via the pin 5a and the engaging groove 2c moves in the direction of the Arrow A or Arrow B only an amount identical to the amount of movement of the pin 5a in the direction of Arrow A or Arrow B. The range of the manual valve 2 can be changed in the order of P→R→N→D→Ds range from the Arrow A side in FIG. 1.

During the rotation of the electric motor 12 described above, the output sector gear 17 rotates in the direction of Arrow C or Arrow D in FIG. 1 when a small gear (not shown) is driven via the magnetic clutch 30. Thus, the range control shaft 7 meshes with and rotates in the same direction as the output sector gear 17, the rotor 21a of the position detecting sensor 21 meshes and rotates with the range control shaft 7, and furthermore, the rotating motion is transmitted via the sensor body 21b to the shift motion controller 20 as a signal S3 that precisely indicates the rotational position of the detent lever 5. Based on this, the range position of the manual valve 2 is determined in response to the rotational angle of the detent lever 5 and, accordingly, that of the output sector gear 17.

Because of the presence of the spring member 57A between the rotor 21a of the position detecting sensor 21 and the range control shaft 7, during the operation connecting the rotor 21a and the range control shaft 7 to the output sector gear 17, it is possible to satisfactorily interlock and connect the engaging portion (protrusion) 32d of the rotor 21a with the engaging notch 51 of the range control shaft 7, while effectively eliminating looseness between the engaging 51 and the protruding portion 32b, by simply fitting the spring plate portion 59 onto the engaging portion 32d of the protruding portion 32b and further fitting the engaging portion 51 of the range control shaft 7 onto the protruding portion 32b, over the plate portion 59.

The engaging portion 32d by engagement within notch 51 directly connects the rotor 21a of the position detecting sensor 21 to the range control shaft 7 and, therefore, when the range control shaft 7 is rotated by the rotation of the output sector gear 17, the rotor 21a is rotated with one to one correspondence to the rotational motion of the range control shaft 7 without looseness of the splined connection between the output sector gear 17 and the rotor 21a. Thus, the rotational position of the range control shaft 7 and, accordingly, that of the detent lever 5, is detected with higher accuracy, and allows for high precision control of the range shift. Further, by disposing the spring member 57A between the mutually engaged engaging convex portion 32d and engaging notch 51, it is possible to satisfactorily fill gaps between the engaging surfaces 51a and 56a, and the engaging surfaces 51b and 56b, thus providing a connecting structure with higher accuracy, and without looseness between the output sector gear 17 and the rotor 21a.

The spring member 57B in FIG. 7, in general, provides the same effect as the spring member 57A; however, looseness between the engaging notch 51 and the protruding portion 32b (engaging convex portion 32d) is more effectively eliminated by the presence of the projections 63 on the spring member 57B.

Also, the O-ring 34 located between the outer peripheral surface of the rotor 21a and the inner peripheral surface of the second hole portion 31b blocks the range control shaft 7 side of the supporting hole 31 from the position detecting sensor 21 to create an oil-tight state, thus enabling complete prevention of problems such as grease between the range control shaft 7 outer peripheral surface and the supporting hole 31 inner peripheral surface, as well as dirt from the range control shaft side, from penetrating into the position detecting sensor 21 side, thereby providing complete protection of the position detecting sensor 21.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A vehicle shift range changeover mechanism comprising:
   a shift range selecting mechanism;
   a drive mechanism that operates in response to operation of the shift range selecting mechanism:
   a shift range operator that changes shift range with driving force from the drive mechanism;
   a range control shaft, defining a rotational axis and transferring the driving force from the drive mechanism to the shift range operator;
   a detent lever connected to said range control shaft in a manner prohibiting relative rotation therebetween, said detent lever being rotatably driven by said drive mechanism;
   a case;
   a detecting mechanism, that detects rotational position of said range control shaft, including a first portion mounted directly on the range control shaft for rotation therewith and a second portion mounted on said case, said first portion of said detecting mechanism being spaced from said detent lever on said rotational axis:
   wherein said first portion of the detecting mechanism is connected to an end of the range control shaft by a notch provided in said end of the range control shaft or in said first portion of said detecting mechanism, and an extension that mates with the notch provided on the other of said range control shaft and said first portion of said detecting mechanism, and wherein the notch defines opposing inner engaging surfaces thereof, and the extension defines opposing outer surfaces; and further comprising:
   a spring plate with a substantially U-shaped cross-section disposed between the inner surfaces of the notch and the outer surfaces of the extension.

2. The vehicle shift range changeover mechanism according to claim 1, wherein:
   the detent lever includes a supporting hole fitted around the range control shaft and said portion of the detecting mechanism has a protrusion fitted within the supporting hole; and
   a first seal member is provided between the supporting hole and the protrusion to create a fluid-tight seal between a range control shaft side and a detecting mechanism side of the supporting hole.

3. The vehicle shift range changeover mechanism according to claim 1, wherein the detent lever has a boss centered on the rotational axis, and a seal member is provided between the boss and a case member of the drive mechanism to create a fluid-tight state in the interior of the drive mechanism.

4. The vehicle shift range changeover mechanism according to claim 1, wherein the spring plate is corrugated at least in part to form projections between the inner surfaces of the notch and the outer surfaces of the extension.

5. The vehicle shift range changeover mechanism according to claim 1, wherein the spring plate has flange portions formed on both ends.

6. The vehicle shift range changeover mechanism according to claim 5, wherein the spring plate is corrugated at least in part to form projections between the inner surfaces of the notch and the outer surfaces of the extension.

7. The shift range changeover mechanism according to claim 1 wherein said shift range operator is a manual valve.

8. The shift range changeover mechanism according to claim 1 wherein said second portion of said detecting mechanism includes a stationary sensor and wherein said first portion of said detecting mechanism is a rotor monitored by the sensor.

9. The vehicle range changeover apparatus according to claim 1 wherein said range control shaft has first and second opposing end portions, wherein said first portion of said detecting means is mounted on said first end portion of said range control shaft and wherein said detent lever is mounted on said second end portion of said range control shaft.

10. The vehicle range changeover apparatus according to claim 9 wherein said first end portion of said range control shaft is rotatably supported within said case.

* * * * *